United States Patent
Sayers et al.

(10) Patent No.: US 8,413,037 B2
(45) Date of Patent: Apr. 2, 2013

(54) USER SELECTION OF FLAW PRESENT WITHIN DIGITALLY SCANNED DOCUMENT

(75) Inventors: Craig P. Sayers, Menlo Park, CA (US); Prakash Reddy, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 135 days.

(21) Appl. No.: 12/824,201

(22) Filed: Jun. 27, 2010

(65) Prior Publication Data

US 2011/0320934 A1  Dec. 29, 2011

(51) Int. Cl.
*G06K 9/40* (2006.01)
(52) U.S. Cl. ......... 715/200; 715/255; 382/112; 382/275
(58) Field of Classification Search .................. 715/255; 382/112, 275
See application file for complete search history.

(56) References Cited

U.S. PATENT DOCUMENTS

| | | | |
|---|---|---|---|
| 5,576,955 A * | 11/1996 | Newbold et al. ............. | 715/217 |
| 5,689,718 A * | 11/1997 | Sakurai et al. ............... | 715/205 |
| 6,594,401 B1 * | 7/2003 | Metcalfe et al. .............. | 382/275 |
| 7,466,873 B2 * | 12/2008 | Eschbach et al. ............. | 382/275 |
| 7,634,112 B1 * | 12/2009 | Lefevere et al. .............. | 382/112 |
| 7,864,985 B1 * | 1/2011 | Lefevere et al. .............. | 382/112 |
| 2003/0231801 A1 * | 12/2003 | Baggs et al. .................. | 382/254 |
| 2004/0254911 A1 * | 12/2004 | Grasso et al. ................. | 707/1 |
| 2006/0221402 A1 * | 10/2006 | Jiang ........................... | 358/3.22 |
| 2007/0003157 A1 * | 1/2007 | Eschbach et al. ............. | 382/275 |
| 2008/0279474 A1 * | 11/2008 | Venable et al. ................ | 382/275 |
| 2009/0251719 A1 * | 10/2009 | Wells et al. ................... | 358/1.15 |
| 2010/0027076 A1 | 2/2010 | Wilsher et al. | |
| 2011/0181616 A1 | 7/2011 | Sayers et al. | |

FOREIGN PATENT DOCUMENTS

| | | |
|---|---|---|
| GB | 2404053 A2 | 1/2005 |
| WO | 0111864 A2 | 2/2001 |

OTHER PUBLICATIONS

Sherif Yacoub, Automated Quality Assurance for Document Understanding Systems, 2003, IEEE Computer Society, pp. 76-82.*
S. Yacoub, "Automated quality assurance for document understanding systems," IEEE Software, vol. 20, No. 3, pp. 76-82, May-Jun. 2003; publisher: IEEE, place of publication: Piscataway, NJ.
Page Improver brochure, pp. 1-2, year 2008; publisher 4DigitalBooks—ASSY SA, place of publication: Ecublens, Switzerland.
Page Improver web page, www.4digitalbooks.com web site, pp. 1-6, Mar. 18, 2010; publisher 4DigitalBooks—ASSY SA, place of publication: Ecublens, Switzerland.
X. Lin "Quality assurance in high volume document digitization: a survey," Procs. of 2nd Int'l Conf. on Doc. Image Analysis for Libraries, pp. 312-319, year 2006; publisher: IEEE Computer Society, place of publication: Washington, DC.
S.J. Simske et al., "User-directed analysis of scanned images," Procs. of DocEng'03, pp. 212-221, year 2003; publisher: ACM; place of publication: New York, NY.

* cited by examiner

*Primary Examiner* — Cesar Paula
*Assistant Examiner* — Mohammed-Ibrahim Zuberi

(57) ABSTRACT

A page of a digitally scanned document and graphical user interface elements (GUI) are displayed. Each GUI element corresponds to a potential flaw within the page and includes an example image of the potential flaw. After the GUI elements are displayed, a user is permitted to select a user-detected flaw present within the page of the digitally scanned document by selecting one of the GUI elements.

15 Claims, 5 Drawing Sheets

USER SELECTION OF FLAW PRESENT WITHIN DIGITALLY SCANNED DOCUMENT

BACKGROUND

Examples of physical documents include books, magazines, newspapers, and other types of documents that include pages of text and/or images. Documents have traditionally been archived within repositories such as libraries. A user wishing to view a given document thus would travel to a repository and locate the document within the repository. More recently, however, documents have begun to be digitally scanned to yield digitally scanned versions of the documents. The digitally scanned documents may be available to users over networks like the Internet. As such, a user wishing to view a given document can thus look up the digitally scanned version of the document from his or her computer, without having to travel to a repository like a library.

DETAILED DESCRIPTION

Figure 1:
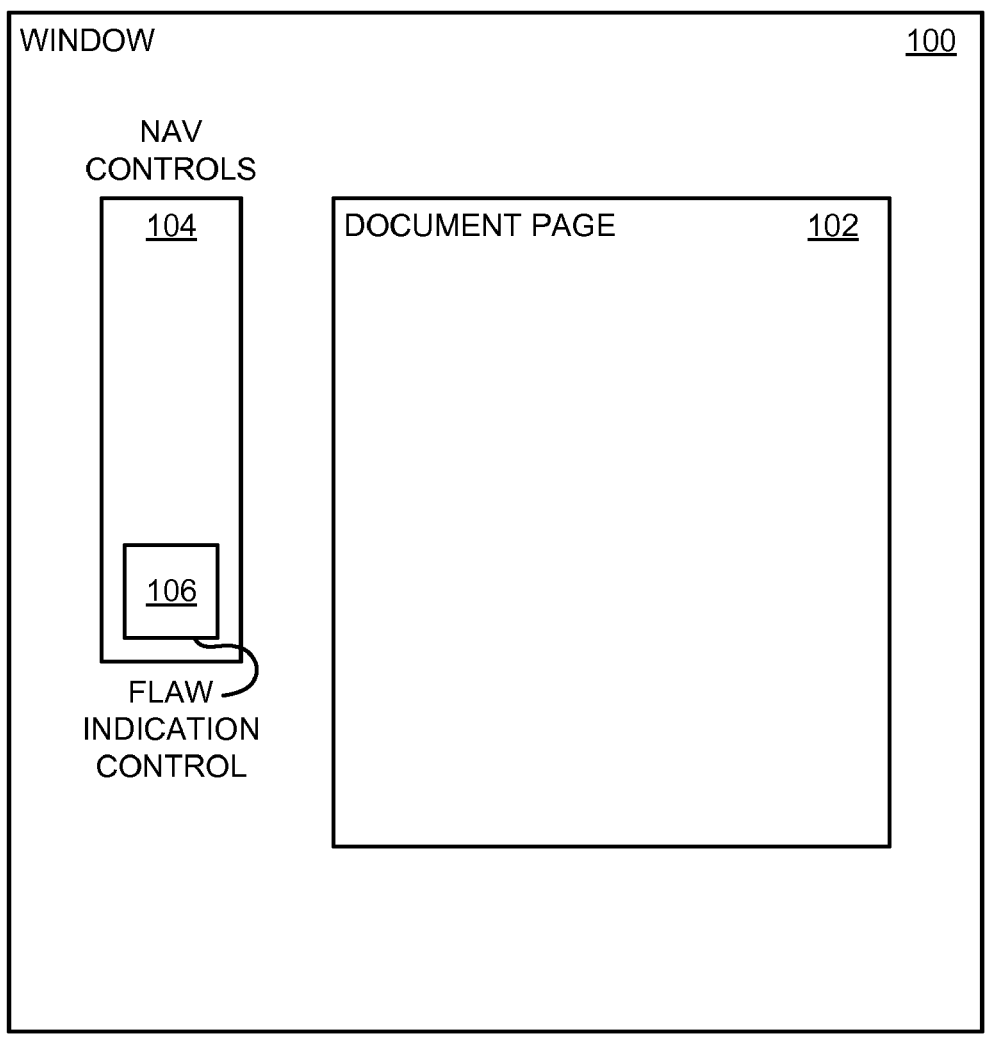
FIGS. 1 and 2 are diagrams of a user interface for a user to select a user-detected flaw within a digitally scanned document, according to an embodiment of the disclosure.

As noted in the background section, documents have begun to be digitally scanned to yield digitally scanned versions of the documents that may be available to users over networks like the Internet. Digitally scanned documents are susceptible to different types of flaws. For instance, the pages of the documents themselves may have flaws, such as graffiti, which are reflected in the digitally scanned versions of the documents.

Furthermore, the scanning process may itself introduce flaws into the digitally scanned documents. For example, an errantly placed finger or thumb on the pages of the documents during scanning can result in a corresponding image of the finger or thumb within the digitally scanned versions of the document. The post-scanning process may also introduce flaws into the digitally scanned documents. For example, a process intended to improve the contrast of text on pages of the digitally scanned documents may unintentionally and undesirably blur the text as well.

Embodiments of the disclosure provide a way by which users can indicate that there are flaws within digitally scanned documents. A page of a digitally scanned document is displayed, as well as a number of graphical user interface (GUI) elements corresponding to potential flaws within the page. Each GUI element includes an example image of its corresponding potential flaw. A user is permitted to select a flaw that the user has detected within the page, from these potential flaws, by selecting a GUI element corresponding to this flaw.

More specifically, a user may navigate the pages of a digitally scanned document using a number of GUI elements corresponding to navigation controls. One of these controls corresponds to indication that a flaw is present within the currently displayed page of the document. In response to the user selecting this control, the GUI elements described in the previous paragraph are presented so that the user can indicate the type of flaw that he or she has detected within the currently displayed page of the document.

By this process, users in effect collaboratively detect the flaws present within digitally scanned documents. In some embodiments, the flaws are attempted to be fixed, either automatically, with user assistance, or by the user him or herself. In some embodiments, information regarding the flaws is displayed. Such information can include the number of users that have also detected a given flaw within the page of a digitally scanned document, the number of users that have indicated that the flaws detected by a particular user are helpful, and the number of flaws that have been detected within a given digitally scanned document by users. The confidence level of the flaws detected by a particular user can also be determined.

In some embodiments, the collaborative detection of flaws present within the digitally scanned documents can be used to identify systemic problems. The systemic problems may originate within the scanning process by which physical documents are scanned to yield the digitally scanned documents. The systemic problems may alternatively or additionally originate within a post-scanning process by which the digitally scanned documents are enhanced after the physical documents have been scanned.

The collaborative detection of flaws can be leveraged in other ways as well. Physical documents can be identified for rescanning, based on the number of flaws that users have detected within the corresponding digitally scanned documents. It can be determined that certain locations, such as certain repositories, from which physical documents are sourced are responsible for a relatively large number of flaws. When a new document is to be obtained for scanning, if the document is available from a number of different locations, then the document may be sourced from the location that has historically provided physical documents that have a relatively small number of flaws.

Figure 2:
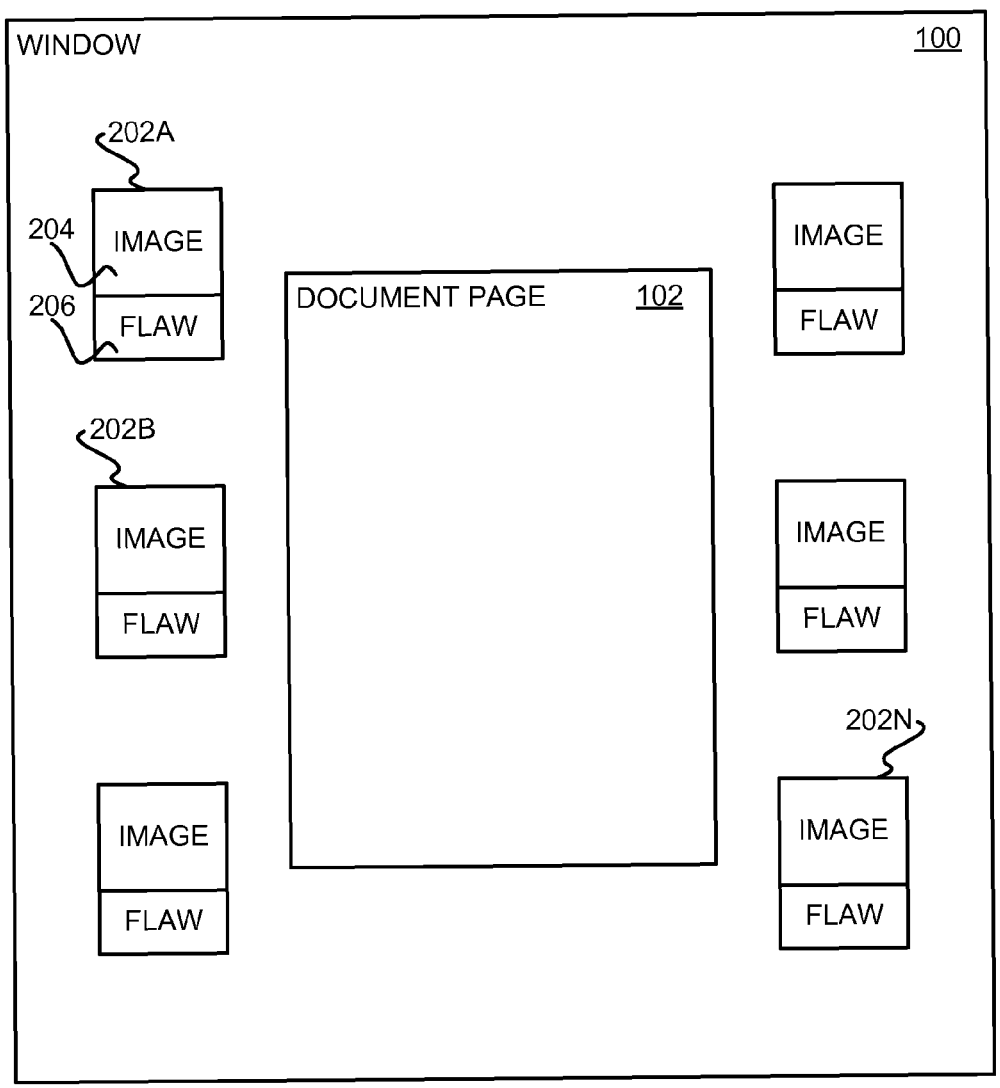

FIGS. 1 and 2 show a window 100 in which a page 102 of a digitally scanned document is displayed, according to an embodiment of the disclosure. The page 102 may be displayed within the window 100 on a display device, by a computing device like a desktop or laptop computer. The window 100 may be a window of a web-browsing computer program that is displaying a web site on which users can view digitally scanned documents, like books, magazines, newspapers, and other types of digitally scanned documents. A digitally scanned document is thus an electronic image of a physical document, where the electronic image has been generated by scanning the physical document using a scanning device like a scanner.

In FIG. 1, a number of graphical user interface (GUI) elements 104 corresponding to navigation controls are displayed. A user can use the navigation controls to navigate among different electronically displayed documents, as well as to navigate among the pages of a selected digitally scanned document. The user may further use the navigation controls to control display of the document page 102 itself, such as to increase the size of the page 102, rotate the page 102, and so on. The user may also be able to navigate among the pages of the digitally scanned documents by selecting various parts of the document page 102 itself. In one embodiment, the pages of electronically displayed documents are navigated as described in the patent application entitled "Graphical Effects for an Electronic Print Media Viewer," filed on Jan. 26, 2010, and assigned Ser. No. 12/693,769.

The GUI elements 104 include a GUI element 106 that corresponds to a flaw indication control. The user selects the GUI element 106 to indicate that he or she has detected a flaw within the page 102 of the digitally scanned document currently being displayed. In response to selection of the GUI element 106, the GUI elements 104 may be removed from the window 100, and in their place a number of other GUI elements displayed, as shown in FIG. 2.

In FIG. 2, responsive to the selection of the GUI element 106 in FIG. 1, GUI elements 202A, 202B, . . . , 202N, collectively referred to as the GUI elements 202, are displayed. Each GUI element 202 corresponds to a potential flaw within the page 102 of the digitally scanned document currently being displayed within the window 100. Each GUI element 202 includes two parts: an image part and a text part. For example, the GUI element 202A includes an image part 204 and a text part 206.

The image part of each GUI element 202 illustratively depicts an example of the potential flaw to which the GUI element 202 corresponds. By comparison, the text part of each GUI element 202 textually describes the potential flaw to which the GUI element 202 corresponds. Examples of potential flaws include one or more portions of a document page being blurry, faded, missing, dirty, having miscellaneous lines, and having the image of a person's thumb or finger. The GUI elements 202 can correspond to other types of potential flaws as well.

As to the blurry flaw, the corresponding GUI element 202 may include a representative example of a blurry image or text within a page, and also include the word "blurry" as describing this image flaw. As to the faded flaw, the corresponding GUI element 202 may include a representative example of a faded image or text within a page, and also include the word "faded" as describing this image flaw. As to the missing flaw, the corresponding GUI element 202 may include a representative example of a portion of a page being missing, and also include the word "missing" as describing this image flaw.

As to the dirty flaw, the corresponding GUI element 202 may include a representative example of dirty and other artifacts on a page, and also include the word "dirty" as describing this image flaw. As to the having miscellaneous lines flaw, the corresponding GUI element 202 may include a representative example of a page having such lines, and also include the word "lines" as describing this image flaw. As to having the image of person's thumb or finger flaw, the corresponding GUI element 202 may include a representative example of a page having a person's thumb on a page, and also include the word "thumb" as describing this image flaw.

By including both image parts and text parts, the GUI elements 202 provide a user two different ways to decipher the flaws to which the elements 202 correspond. For example, a user may not know what is meant by a flaw that is described as "thumb," but by viewing an image where a person's thumb has been errantly included on a page of a digitally scanned document, the user may understand the type of flaw that the GUI element 202 in question represents. As another example, a user may not understand the type of flaw that an image of a page including various artifacts represents, but by reading that this flaw corresponds to "dirty," understand that the flaw relates to dirt and other artifacts being present within a page.

The user is permitted to select the GUI element 202 that best represents the flaw that the user has detected on the page 102 of the digitally scanned document. In some embodiments, there may be additional GUI elements labeled "no flaw" or "other issue." The user in such embodiments can select the former GUI element if the user has in fact decided that no flaw is present on the page 102, and can select the latter GUI element if the user does not believe that any of the GUI elements 202 represents the flaw that the user has detected on the page 102.

Embodiments of the disclosure thus leverage the fact that users are viewing pages of digitally scanned documents to aid in the detection of flaws on the pages of these documents. That is, the users who are viewing the pages of the documents at least primarily for purposes other than flaw detection are asked to also detect such flaws. Such flaw detection can be in addition to or in lieu of paying users specifically to detect flaws and/or developing computer programs to automatically detect the flaws.

In one embodiment, once the user has identified the flaw within the currently displayed page of a digitally scanned document via selection of an appropriate GUI element 202, the next page within the document is automatically displayed to the user while the GUI elements 202 are still being displayed. This embodiment minimizes the number of selections that the user has to make to identify flaws within consecutive pages of a digitally scanned document. As soon as a flaw within one page is identified, the next page is displayed, and as soon as a flaw within this page is identified, another page is displayed, and so on.

Figure 3:
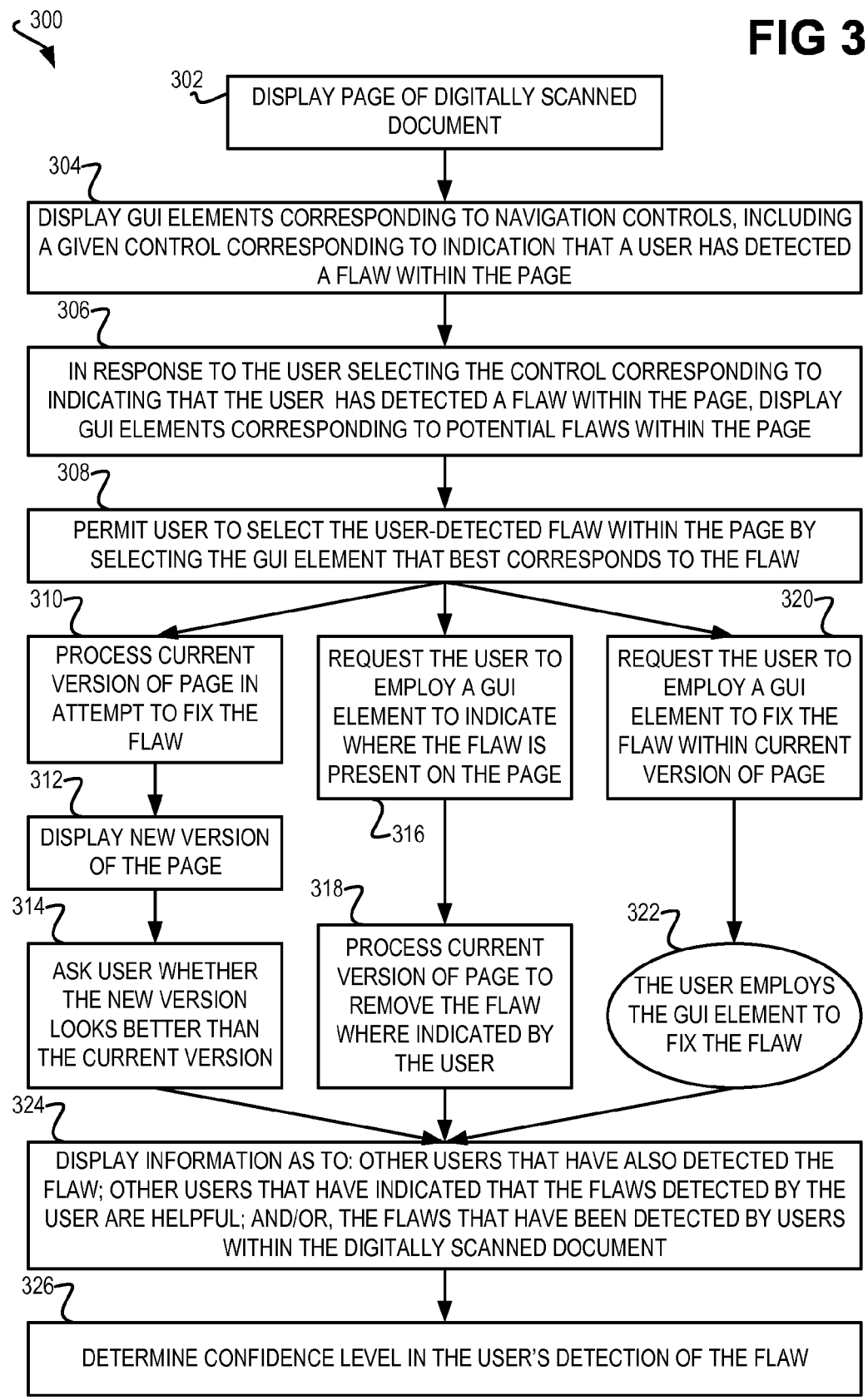
FIG. 3 is a flowchart of a method for permitting a user to select a user-detected flaw within a digitally scanned document, for potentially correcting the flaw, and for displaying other information regarding the flaw and/or the user that detected the flaw, according to an embodiment of the disclosure.

FIG. 3 shows a method 300 by which a user can indicate that he or she has detected a flaw within the page 102 of a digitally scanned document, according to an embodiment of the disclosure. As with methods of other embodiments, the method 300 can be implemented as one or more computer programs stored on a computer-readable data storage medium. Execution of the computer programs by a processor result in performance of the method 300. The computer-readable data storage medium may be a non-volatile medium, such as a hard disk drive, a volatile medium, such as a semiconductor memory, and so on.

The page 102 of a digitally scanned document is displayed within the window 100 (302). The GUI elements 104 corresponding to navigation controls are also displayed within the window 100 (304). The GUI elements 104 include the GUI element 106 that corresponds to the user indicating that he or she has detected a flaw within the page 102. In response to the user selecting the GUI element 106, the GUI elements 202 corresponding to potential flaws that may be within the page 102 are displayed within the window 100 (306). The user is permitted to select the flaw that he or she has detected within the page from these potential flaw, by selecting the GUI element 202 that best corresponds to the flaw (308).

In some embodiments, corrective actions may be taken to attempt to remove the flaw from the page 102. Three different series of corrective actions are depicted in FIG. 3: a first series of actions represented by parts 310, 312, and 314; a second series of actions represented by parts 316 and 318; and a third series of actions represents by parts 320 and 322. In a given embodiment, one or more of these series, or other series of correction actions, may be employed to attempt to remove the user-detected flaw from the page 102.

In the first series of actions, the method 300 processes the current version of the page 102 (i.e., the version of the page 102 that is currently being displayed within the window 100) to attempt to fix the user-detected flaw automatically and without user interaction (310). The method 300 displays the new version of the page 102 (312), and asks the user whether the new version looks better than the version of the page 102 that was originally displayed (314). If the user indicates that the new version of the page 102 looks better, then the new version of the page 102 may replace the version of the page 102 that was originally displayed. As such, when the page 102 is displayed for other users in the future, the new version may then be displayed.

For example, the user may have indicated that the flaw that he or she detected within the page 102 of the digitally scanned document is that the page 102 is blurry. After the physical document to which the digitally scanned document corresponds was scanned to create the digitally scanned document, a post-scanning process may have been performed to optimize focus. This process may have identified a number of different settings for focus of the page 102 that the process could not determine which was best. As such, the process may have selected as the current version of the page 102 one such group of focus settings. Therefore, when the user indicated that the flaw that he or she detected was blurriness, the page 102 may be reprocessed in accordance with one of the other different groups of focus settings.

In the second series of actions, the method 300 requests that the user employ a GUI element to indicate where the flaw that the user has detected is present within the page 102 (316). The method 300 may then process the current version of the page 102 to remove the flaw from the location on the page 102 where the user has indicated the flaw is located (318). In this way, the flaw is removed with user interaction, insofar as the user informs where the flaw is on the page 102.

For example, the user may have indicated that the flaw that he or she has detected within the page 102 of the digitally scanned document is that there is an image of someone's thumb on the page 102. For example, during scanning of the physical document to create the digitally scanned document, the operator who operated the scanning device may have inadvertently placed his or her thumb on the bottom edge of the page 102. The user may thus use an appropriate GUI element to define an area on the page 102 that includes the image of the thumb. Thereafter, where there is no text in this area of the page 102, the method 300 deletes this portion of the page 102 to remove the image of the thumb from the page 102.

In the third series of actions, the method 300 requests that the user employ a GUI element to fix the flaw within the current version of the page 102 him or herself (320), such that the user him or herself corrects the flaw using the GUI element (322). For example, the user may have indicated that the flaw that he or she has detected within the page 102 is that the margin to the left of the text on the page 102 is significantly greater than the margin to the right of this text. As such, the user may be asked to move the text so that it is centered from left to right on the page 102 such that the left and right margins are equal. In this respect, the text of the page 102 itself becomes the GUI element that permits the user to correct the flaw that he or she has detected within the page 102.

The method 300 as has been described thus far is generally performed by a relatively large number of users for the pages of a relatively large number of digitally scanned documents. In this respect, it is said that the users collaboratively correct the flaws present within the digitally scanned documents. Although any given user may identify a relatively small number of flaws, where there are a large number of such users, the majority of the flaws within the pages of the digitally scanned documents may be able to be detected in a relatively short period of time.

The method 300 may display various information regarding the flaws detected by users within digitally scanned documents (324). For example, for a particular flaw that a given user has just detected within the page 102 of a digitally scanned document, the method 300 may display the number of other users, or the percentage of all the users, that have also detected this same flaw. As a second example, the method 300 may display the number of flaws that users have detected within a digitally scanned document as a whole, to give a potential viewer of the document an idea for how many flaws are present within the document.

As a third example, users may be permitted to indicate whether the identification of a flaw on the page 102 of a digitally scanned document has been particularly helpful to them. The method 300 can then display to each user that has identified this flaw the number of users, or the percentage of all the users, that have indicated that identification of this flaw was helpful to them. This may act as a sort of positive reinforcement, so that users who identify flaws within digitally scanned documents are motivated to find further flaws, because other users have found their identification of flaws helpful.

When deciding whether to accept a user's detection (i.e., identification) of a flaw within the page 102 of a digitally scanned document, the method 300 may determine the confidence level in the user's detection of the flaw (326). If the confidence level is relatively low, then the user's detection of a flaw may not be automatically accepted without additional confirmation or verification. If the confidence level is very low, then the user's detection of a flaw may be automatically discarded. If the confidence level is relatively high, then the user's detection of a flaw may be automatically accepted without further confirmation or verification.

The confidence level in the user's detection of a flaw within the page 102 of a digitally scanned document may be determined based on a number of different factors. One such factor is the number of other users that have detected the same flaw within the page 102. Another such factor is the number of other flaws that the user has been concluded to have accurately detected or identified. For instance, if either such factor is greater than a corresponding threshold, then the confidence level in the user's detection of another flaw may be judged to be sufficiently high to automatically accept without additional confirmation or verification.

Figure 4:
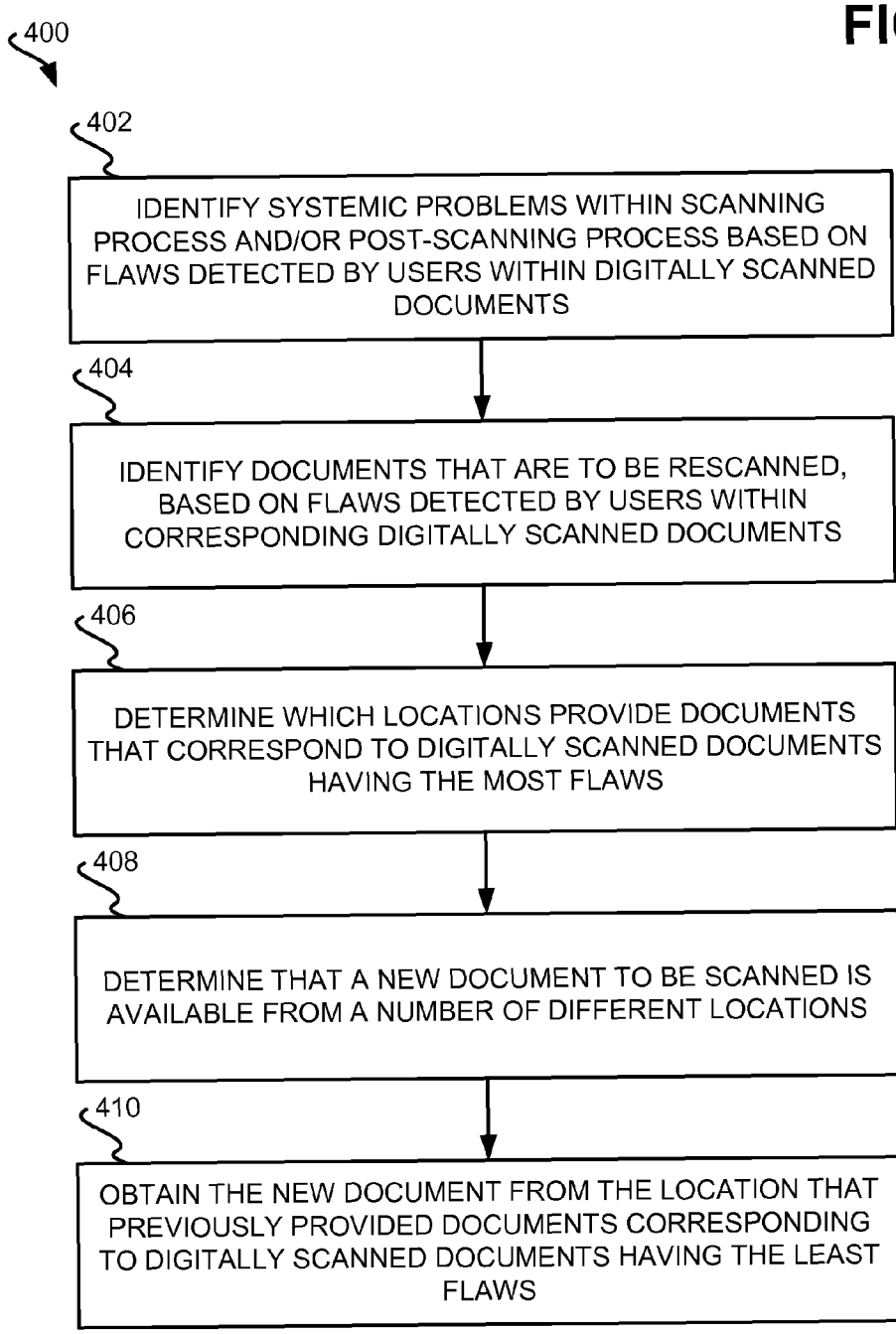
FIG. 4 is a flowchart of a method for leveraging the flaws detected within digitally scanned documents by users, according to an embodiment of the disclosure.

FIG. 4 shows a method 400 by which the flaws detected by users within the pages of digitally scanned documents can be leveraged, according to an embodiment of the disclosure. One way in which the user-detected flaws can be leveraged is to identify systemic problems within the scanning process and/or the post-scanning process (402). The scanning process is the process by which the pages of a physical document are scanned using a scanning device like a scanner to generate a corresponding digitally scanned document. The post-scanning process is any sort of processing performed on the digitally scanned document after scanning, to potentially enhance the quality of the digitally scanned document.

An example of a systemic problem in the scanning process that can be identified based on the flaws detected by users within the pages of digitally scanned documents is the presence of images of thumbs and fingers in a relatively large number of such pages. The systemic problem in this case is that the operators are operating the scanning devices in such a way that they are inadvertently placing their thumbs or fingers on the pages of the physical documents such that images of their thumbs or fingers appear within the digitally scanned documents. This systemic problem can be detected if a large number of corresponding flaws are detected by users. The solution to this problem may be to provide better training to the operators, or to otherwise remind them to not place their thumbs or fingers on the pages of the physical documents during scanning in a way that they appear within the digitally scanned documents.

An example of a systemic problem in the post-scanning process that can be identified based on the flaws detected by users within the pages of digitally scanned documents is the introduction of blurriness into the pages of the documents. The systemic problem in this case may be that the post-scanning process may be inadvertently blurring the pages of digitally scanned documents when performing another type of image enhancement. This systemic problem can be detected if a large number of corresponding flaws are detected by users. The solution to this problem may be to adjust the post-scanning process so that it does not introduce blurriness into the pages of the digitally scanned documents.

Systemic problems can be identified by correlating the flaws that have been identified within digitally scanned documents with other information regarding the documents. Such other information can include who scanned a physical document corresponding to a digitally scanned document, the location from which the physical document was obtained, how old the physical document is, the type of post-scanning process that has been performed, and so on. For example, it may be determined that page margins are detected incorrectly during the post-scanning process for relatively thick physical documents that have been scanned with a particular type of scanning device.

Another way in which the user-detected flaws can be leveraged is to identify physical documents that are to be rescanned (404). For example, if users have detected flaws within a percentage of the pages of a given digitally scanned document greater than a threshold, then the physical document that was scanned to generate this digitally scanned document may be identified as a candidate for rescanning. The scanning process may have been originally performed in such a way that the digitally scanned document contains a relatively large number of flaws, such that rescanning the corresponding physical document may remove these flaws and result in a better version of the digitally scanned document.

A third way in which the user-detected flaws can be used is as follows. Physical documents may be sourced from a number of different locations, such as repositories like libraries. Different locations may provide documents that have varying degrees of quality. For example, the physical documents from one location may be in relatively pristine condition, whereas the physical documents from another location may have significant amounts of graffiti written on their pages.

Therefore, the method 400 determines which locations provided physical documents that correspond to digitally scanned documents having the most flaws (406). At some point, a new physical document may be desired to be obtained for scanning to generate a corresponding digitally scanned document. It may be determined that this new document is available from a number of different locations (408). As such, the new physical document is obtained from the location that previously provided documents that correspond to digitally scanned documents having the least number of flaws (410). Therefore, it may be probable that the new physical document obtained from this location also has few flaws.

It is noted that the locational information determined in part 406 can be used in other ways as well. For instance, the order in which digitally scanned documents are presented to users may be based on such locational information, as well as other information. As one example, users may be presented with digitally scanned documents in an order corresponding to the number of flaws that have been identified in the documents, where documents having more flaws are presented higher in the order than documents having greater flaws. As another example, digitally scanned documents that are relatively new or that have been reviewed by relatively small numbers of users may not have any flaws identified in them yet. Therefore, the ranking of such digitally scanned documents within the order may be determined based on the number of flaws that have been identified in digitally scanned documents corresponding to physical documents from the same location.

Figure 5:
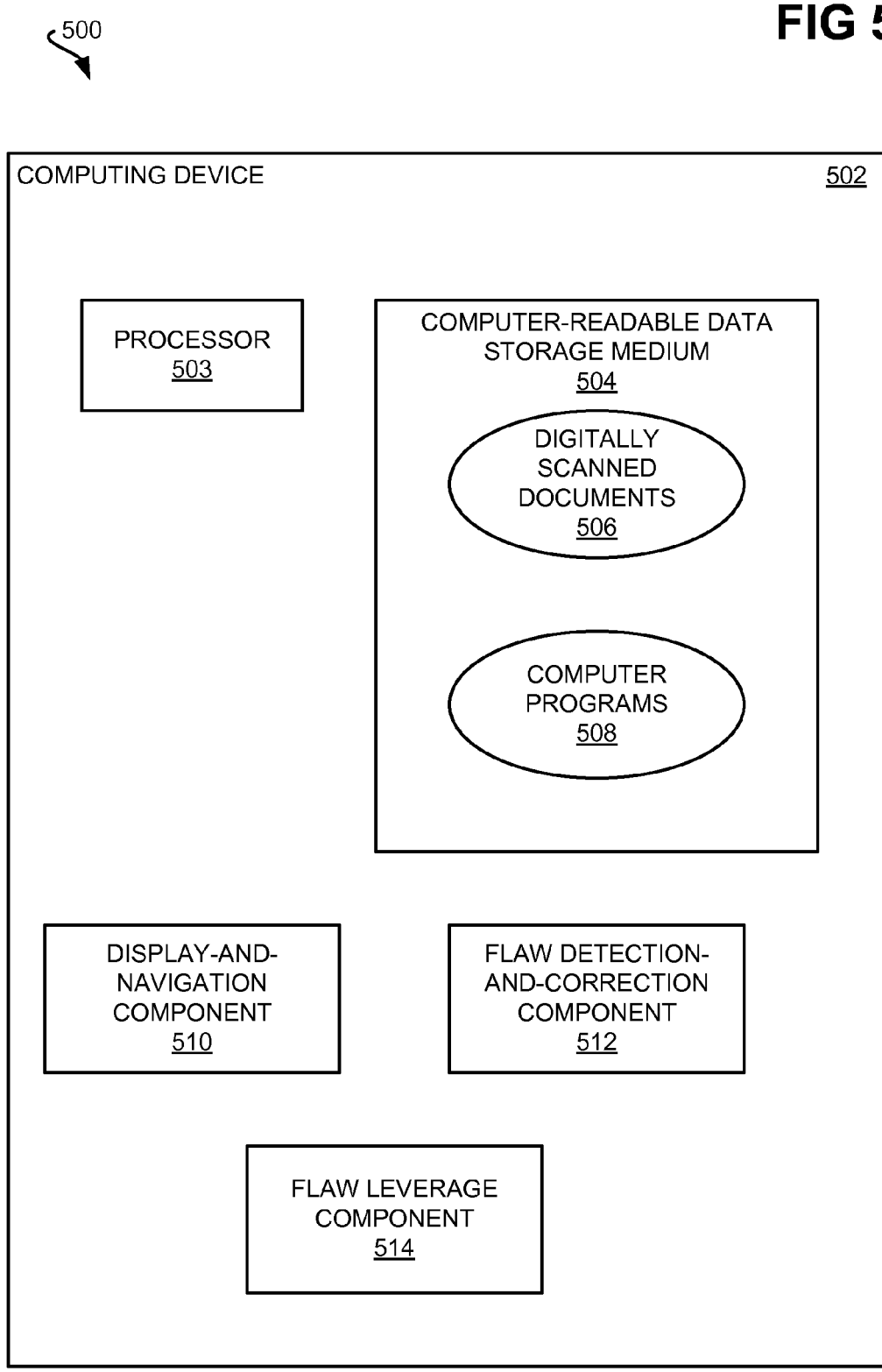
FIG. 5 is a diagram of a rudimentary system, according to an embodiment of the disclosure.

In conclusion, FIG. 5 shows a rudimentary system 500, according to an embodiment of the disclosure. The system 500 is implemented in FIG. 5 as a single computing device 502, but in other embodiments may be implemented over a number of such computing devices. The computing device 502 includes a processor 503, a computer-readable data storage medium 504, and typically other hardware in addition to the processor 503 and the medium 504. The computer-readable data storage medium 504 may be or include volatile media, such as semiconductor memory, and/or non-volatile media, such as hard disk drives.

The computer-readable data storage medium 504 stores digitally scanned documents 506 and one or more computer programs 508. The system 500 includes a number of components 510, 512, and 514. The components 510 are said to be implemented by the computer programs 508. That is, execution of the computer programs 508 by the processor 503 from the computer-readable data storage medium 504 results in performance of the functionality of the components 510, 512, and 514.

The component 510 is a display-and-navigation component. The component 510 displays pages of the digitally scanned documents 506, and displays the GUI elements 104 that correspond to navigation controls for navigating among these pages. In this respect, the component 510 performs parts 302 and 304 of the method 300 of FIG. 3.

The component 512 is a flaw detection-and-correction component. The component 512 displays the GUI elements 202 that correspond to potential flaws within the pages of the digitally scanned documents 506, and permits the user to select the GUI elements 202 that best correspond to the flaws that the user has detected within these pages. In this respect, the component 512 performs parts 306, 308, 310, 312, 314, 316, 318, 320, 322, 324, and/or 326 of the method 300 of FIG. 3.

Finally, the component 514 is a flaw leverage component. The component 514 leverages the flaws detected by users within the pages of the digitally scanned documents 506 for various purposes. As such, the component 514 performs the method 400 of FIG. 4, in relation to which exemplary purposes for which the flaws detected by users within the digitally scanned documents 506 can be leveraged have been described.

We claim:

1. A method comprising:
without processing a page of a digitally scanned document to identify flaws within the page,
displaying the page of the digitally scanned document;
displaying a plurality of graphical user interface (GUI) elements, each GUI element corresponding to a potential flaw within the page and including an example image of the potential flaw, the example image of the potential flaw not being an image of a portion of the page of the digitally scanned document itself, the potential flaw being a flaw that is potentially but not necessarily present within the page; and,
after displaying the GUI elements, permitting a user to select a user-detected flaw present within the page of the digitally scanned document by selecting one of the GUI elements.

2. The method of claim 1, wherein the plurality of GUI elements is a plurality of first GUI elements, the method further comprising:
displaying a plurality of second GUI elements corresponding to a plurality of controls for navigating the digitally scanned document, the controls including a given control corresponding to indication that a flaw is present within the page of the digitally scanned document currently being displayed,
wherein the first GUI elements are displayed in response to the user selecting the given control.

3. The method of claim 1, wherein the page of the digitally scanned document is a current version of the page, and the method further comprises, in response to detecting that the user has selected one of the GUI elements,
processing the current version of the page in an attempt to fix the flaw, yielding a new version of the page;
displaying the new version of the page; and,
asking the user whether the new version of the page looks better than the current version of the page as to the user-detected flaw.

4. The method of claim 1, wherein the page of the digitally scanned document is a current version of the page, and the method further comprises, in response to detecting that the user has selected one of the GUI elements,
requesting that the user employ a second GUI element to indicate where the flaw is present within the current version of the page; and,
processing the current version of the page to remove the flaw based on where the user indicated the flaw is present, yielding a new version of the page.

5. The method of claim 1, wherein the page of the digitally scanned document is a current version of the page, and the method further comprises, in response to detecting that the user has selected one of the GUI elements,
requesting that the user employ a second GUI element to correct the flaw within the current version of the page,
wherein the user employing the second GUI element to correct the flaw within the current version of the page yields a new version of the page.

6. The method of claim 1, further comprising one or more of:
displaying information as to other users that have also detected the user-detected flaw present within the page of the digitally scanned document;
displaying information as to other users that have indicated that the flaws detected by the user are helpful;
displaying information as to flaws having been detected by users within the digitally scanned document.

7. The method of claim 1, further comprising determining a confidence level in selection of the user-detected flaw within the page by the user, based on one or more of:
a number of other users that detected the user-detected flaw within the page;
a number of other flaws that the user has been concluded to have accurately detected.

8. The method of claim 1, wherein the user is a given user, the user-detected flaw is a given user-detected flaw, and the digitally scanned document is a given digitally scanned document, and wherein the method further comprises:
based on a plurality of user-detected flaws, including the given user-detected flaw, detected by users, including the given user, within pages of digitally scanned documents, including the given digitally scanned document, identifying a systemic problem within one or more of:
a scanning process by which physical documents have been scanned to yield the digitally scanned documents;
a post-scanning process by which the digitally scanned documents are enhanced after the physical documents have been scanned.

9. The method of claim 1, wherein the user is a given user, the user-detected flaw is a given user-detected flaw, and the digitally scanned document is a given digitally scanned document, and wherein the method further comprises:
based on a plurality of user-detected flaws, including the given user-detected flaw, detected by users, including the given user, within pages of digitally scanned documents, including the given digitally scanned document, identifying physical documents having corresponding digitally scanned documents that are to be rescanned to yield digitally scanned documents with fewer flaws.

10. The method of claim 1, wherein the user is a given user, the user-detected flaw is a given user-detected flaw, and the digitally scanned document is a given digitally scanned document, and wherein the method further comprises:
based on a plurality of user-detected flaws, including the given user-detected flaw, detected by users, including the given user, within pages of digitally scanned documents, including the given digitally scanned document, where physical documents corresponding to the digitally scanned documents are sourced from a plurality of different locations,
determining which of the different locations provided the physical documents corresponding to the digitally scanned documents having more user-detected flaws.

11. The method of claim 10, further comprising:
determining that a new physical document to be scanned to yield a corresponding digitally scanned document is available from a number of the different locations;
obtaining the new physical document from the different location that previously provided the physical documents corresponding to the digitally scanned documents having less user-detected flaws.

12. A non-transitory computer-readable data storage medium having one or more computer programs stored thereon for execution by a processor to cause a method to be performed, the method comprising:
without processing a page of a digitally scanned document to identify flaws within the page,
displaying the page of the digitally scanned document;
displaying a plurality of graphical user interface (GUI) elements, each GUI element corresponding to a potential flaw within the page and including an example image of the potential flaw, the example image of the potential flaw not being an image of a portion of the page of the digitally scanned document itself, the potential flaw being a flaw that is potentially but not necessarily present within the page; and,
after displaying the GUI elements, permitting a user to select a user-detected flaw present within the page of the digitally scanned document by selecting one of the GUI elements.

13. The non-transitory computer-readable data storage medium of claim 12, wherein the page of the digitally scanned document is a current version of the page, and the method further comprises, in response to detecting that the user has selected one of the GUI elements, one of:
a first set of actions comprising:

processing the current version of the page in an attempt to fix the flaw, yielding a new version of the page;
displaying the new version of the page; and,
asking the user whether the new version of the page looks better than the current version of the page as to the user-detected flaw;
a second set of actions comprising:
requesting that the user employ a second GUI element to indicate where the flaw is present within the current version of the page; and,
processing the current version of the page to remove the flaw based on where the user indicated the flaw is present, yielding the new version of the page;
a third set of actions comprising:
requesting that the user employ a third GUI element to correct the flaw within the current version of the page, wherein the user employing the third GUI element to correct the flaw within the current version of the page yields the new version of the page.

14. A system comprising:
a processor to execute one or more computer programs;
a computer-readable data storage medium to store a digitally scanned document;
a first component implemented by the computer programs to, without processing a page of the digitally scanned document to identify flaws within the page, display the page of the digitally scanned document on a display device, and display a plurality of graphical user interface (GUI) elements on the display device, each GUI element corresponding to a potential flaw within the page and including an example image of the potential flaw, the example image of the potential flaw not being an image of a portion of the page of the digitally scanned document itself, the potential flaw being a flaw that is potentially but not necessarily present within the page; and,
a second component implemented by the computer programs to permit a user to select a user-detected flaw present within the page of the digitally scanned document by selecting one of the GUI elements.

15. The system of claim 14, wherein the second component is further to perform one of:
a first set of actions comprising:
processing the current version of the page in an attempt to fix the flaw, yielding a new version of the page;
displaying the new version of the page on the display device; and,
asking the user whether the new version of the page looks better than the current version of the page as to the user-detected flaw;
a second set of actions comprising:
requesting that the user employ a second GUI element to indicate where the flaw is present within the current version of the page; and,
processing the current version of the page to remove the flaw based on where the user indicated the flaw is present, yielding the new version of the page;
a third set of actions comprising:
requesting that the user employ a third GUI element to correct the flaw within the current version of the page, wherein the user employing the third GUI element to correct the flaw within the current version of the page yields the new version of the page.

* * * * *